(12) United States Patent
Takahashi et al.

(10) Patent No.: US 11,061,747 B2
(45) Date of Patent: Jul. 13, 2021

(54) API COORDINATION DEVICE, API COORDINATION METHOD AND API COORDINATION PROGRAM

(71) Applicant: Nippon Telegraph and Telephone Corporation, Tokyo (JP)

(72) Inventors: Kensuke Takahashi, Tokyo (JP); Hiroyuki Tanaka, Tokyo (JP); Naoyuki Tanji, Tokyo (JP); Nobuo Onai, Tokyo (JP); Naoki Take, Tokyo (JP); Hiroyuki Yazaki, Tokyo (JP); Hiroshi Kato, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/971,536

(22) PCT Filed: Feb. 14, 2019

(86) PCT No.: PCT/JP2019/005251
§ 371 (c)(1),
(2) Date: Aug. 20, 2020

(87) PCT Pub. No.: WO2019/163623
PCT Pub. Date: Aug. 29, 2019

(65) Prior Publication Data
US 2020/0394088 A1      Dec. 17, 2020

(30) Foreign Application Priority Data

Feb. 20, 2018    (JP) .............................. JP2018-028288

(51) Int. Cl.
*G06F 9/54*       (2006.01)
*H04L 29/06*    (2006.01)

(52) U.S. Cl.
CPC .............. *G06F 9/547* (2013.01); *G06F 9/541* (2013.01); *H04L 67/40* (2013.01)

(58) Field of Classification Search
CPC ........... G06F 9/547; G06F 9/541; H04L 67/40
See application file for complete search history.

(56) References Cited

U.S. PATENT DOCUMENTS

| 2003/0061404 A1* | 3/2003 | Atwal ..................... G06Q 30/04 |
| | | 719/328 |
| 2006/0031850 A1* | 2/2006 | Falter ....................... G06F 9/465 |
| | | 719/320 |
| 2006/0234698 A1 | 10/2006 | Fok et al. |

FOREIGN PATENT DOCUMENTS

| JP | 2008-538069 A | 10/2008 |
| JP | 2011-118587 A | 6/2011 |

(Continued)

OTHER PUBLICATIONS

PCT International Search Report and Written Opinion in International Appln. No. PCT/JP2019/005251, dated Apr. 25, 2019, 14 pages (with English Translation).

(Continued)

*Primary Examiner* — Brian W Wathen
(74) *Attorney, Agent, or Firm* — Fish & Richardson P.C.

(57) ABSTRACT

An API coordination device according to the present invention executes a coordinated service combining wholesale services of a plurality of wholesale providers by launching an API published to a service provider and by launching, in response to an order from the service provider, APIs through which the wholesale providers publish the wholesale services. The API coordination device includes: a catalog/rule management section configured to hold a coordination rule defining API simplification which is to be performed in such a way that, among parameters for executing the coordinated service, a subset of the parameters is hidden and the others (Continued)

of the parameters are published to the service provider; and an execution section configured to read the coordination rule and to launch the API published to the service provider in such a way as to hide the subset of the parameters and publishes the others of the parameters to the service provider.

9 Claims, 11 Drawing Sheets

(56) References Cited

FOREIGN PATENT DOCUMENTS

| JP | 2011-248574 A | 12/2011 |
|----|---------------|---------|
| JP | 2017-068474 A | 4/2017  |

OTHER PUBLICATIONS

Soejima et al., "Initiatives for One-Stop Operation Technology", NTT Technical Journal, Aug. 2016, 28(8):23-24, 5 pages (with English Translation).

Takahashi et al., "A Method of Coordination Fulfillment among Multiple Service Providers for B2B2X Business Model," IEICE 2016 Communication Society Conference Proceedings 2, Sep. 2016, p. 342, 3 pages (with English Translation).

Takahashi et al., "An Orchestrator that Realizes Coordination Fulfillment among Multiple Services Providers," IEICE Technical Report, Mar. 2018, 117(491):91-96 (English Abstract).

Takahashi et al., "Architecture for increasing flexibility in the coordination of services among multiple providers," Proceedings of the Institute of Electronics, Information and Communication Engineers Society conference 2, Sep. 2017, p. 245, 3 pages (with English Translation).

* cited by examiner

API COORDINATION DEVICE, API COORDINATION METHOD AND API COORDINATION PROGRAM

CROSS-REFERENCE TO RELATED APPLICATIONS

This application is a National Stage application under 35 U.S.C. § 371 of International Application No. PCT/JP2019/005251, having an International Filing Date of Feb. 14, 2019, which claims priority to Japanese Application Serial No. 2018-028288, filed on Feb. 20, 2018. The disclosure of the prior application is considered part of the disclosure of this application, and is incorporated in its entirety into this application.

TECHNICAL FIELD

The present invention relates to an API coordination device, an API coordination method and an API coordination program that simplify an application programming interface (API) through which a coordinated service combining wholesale services of a plurality of wholesale providers (wholesale service providers) is published (or provided) to a service provider and dynamically coordinate APIs published by wholesale providers, wherein the wholesale services provide communications services.

BACKGROUND ART

Currently, wholesale providers providing communication services such as a network service, cloud service, and application service are appearing. Along with this, some of the service providers providing services to end users are beginning to provide their custom services by combining the wholesale services (also referred to as services) provided by the wholesale providers, without owning their own resources.

The wholesale providers provide, to service providers, coordinated services combining (coordinating) wholesale services published as APIs for sharing software functions. Examples of this sort of technique are disclosed in the Non-Patent Literatures 1 and 2.

Non-Patent Literature 1 discloses a technique of setting and coordinating a network service combining multiple wholesale services, which is a method for setting and coordinating services among multiple providers in a Business-to-Business-to-X (B2B2X, where X is Consumer for example) business model. With regard to this technique, Non-patent Literature 1 discloses a method for setting multiple wholesale services in a coordinated manner using a catalog and/or coordination rules in which the specifications of the wholesale services are described, and discloses the whole architecture and operation image of a device configured to perform that method.

Non-Patent Literature 2 discloses an architecture of a technique for increasing the flexibility in the coordination of services among multiple providers. It discloses a technique of setting and coordinating a network service combining multiple services using a new API. With regard to this technique, Non-patent Literature 2 discloses an architecture in which the specifications of the services are described in a catalog and a service independent part and a service dependent part are linked as an adapter, wherein the service independent part reads the catalog to execute services and the service dependent part executes the APIs of the services individually.

PRIOR ART DOCUMENT

Non-Patent Literature

Non-Patent Literature 1: Kensuke TAKAHASHI and other four persons, "A Method of Coordination Fulfillment among Multiple Service Providers for B2B2X Business Model", Proceedings of the Institute of Electronics, Information and Communication Engineers Society conference 2, B-14-10, Sep. 20 to 23, 2016

Non-Patent Literature 2: Kensuke TAKAHASHI and other three persons, "Architecture for increasing flexibility in the coordination of services among multiple providers", Proceedings of the Institute of Electronics, Information and Communication Engineers Society conference 2, B-14-8, Sep. 12 to 15, 2017

SUMMARY OF INVENTION

Problems to be Solved by the Invention

Regarding the techniques disclosed in Non-Patent Literatures 1 and 2, there is a demand to simplify the APIs published to service providers in the event of coordinating multiple services, into an easily understandable form. However, Non-Patent Literatures 1 and 2 are silent as to API simplification.

Moreover, the techniques disclosed in Non-Patent Literatures 1 and 2 can improve the services by dynamically coordinating the APIs of the wholesale services published by the wholesale providers according to the content of the services in the event of launching the APIs. However, Non-Patent Literatures 1 and 2 are silent as to dynamic coordination of the APIs.

The present invention has been made in view of the above circumstances and it is an object of the present invention to simplify the API through which a coordinated service combining wholesale services of a plurality of wholesale service providers is published to service providers, the wholesale services providing communications services. It is another object of the present invention to dynamically coordinate the APIs published by the wholesale service providers.

Solution to Problem

To provide means for resolving the above-described problem, the invention according to claim 1 is an API coordination device configured to execute a coordinated service combining wholesale services of a plurality of wholesale providers by launching an API published to a terminal device of a service provider providing a communication service to a user and by launching, in response to an order from the terminal device, APIs through which the plurality of wholesale providers publish the wholesale services, the wholesale services providing communications services, the API execution device comprising: a management section configured to hold a coordination rule including a first rule defining API simplification which is to be performed in such a way that, among parameters for executing the coordinated service, a subset of the parameters is hidden and the others of the parameters are published to the service provider; and an execution section configured to read the first rule held by the management section and to launch the API published to the terminal device in such a way as to hide the subset of the parameters for executing the coordinated service and publish the others of the parameters to the terminal device.

The invention according to claim 8 is an API coordination method performed by an API coordination device configured to execute a coordinated service combining wholesale services of a plurality of wholesale providers by launching an API published to a terminal device of a service provider providing a communication service to a user and by launching, in response to an order from the terminal device, APIs through which the plurality of wholesale providers publish the wholesale services, the wholesale services providing communications services, the API coordination method comprising steps of: creating a coordination rule including a first rule defining API simplification which is to be performed in such a way that, among parameters for executing the coordinated service, a subset of the parameters is hidden and the others of the parameters are published to the service provider; and reading the first rule and launching the API published to the terminal device in such a way as to hide the subset of the parameters for executing the coordinated service and publish the others of the parameters to the terminal device.

The invention according to claim 9 is a program causing a computer to serve as an API coordination device configured to execute a coordinated service combining wholesale services of a plurality of wholesale providers by launching an API published to a terminal device of a service provider providing a communication service to a user and by launching, in response to an order from the terminal device, APIs through which the plurality of wholesale providers publish the wholesale services, the wholesale services providing communications services, the program causing the computer to function as: means for holding a description of a first rule defining API simplification which is to be performed in such a way that, among parameters for executing the coordinated service, a subset of the parameters is hidden and the others of the parameters are published to the service provider; and means for reading the first rule and launching the API published to the terminal device in such a way as to hide the subset of the parameters for executing the coordinated service and publish the others of the parameters to the terminal device.

With the configuration of claim 1, the method of claim 8, and the program of claim 9, it is possible to present only a simplified set of the parameters for executing the plurality of wholesale services to the terminal device of the service provider. Thus, those make it easy for the service provider to set the parameters in the event of placing an order. In addition, those make it possible to create flexible services menus in such a manner as to allow a certain service provider to make detailed settings and allow another service provider to make simplified settings, only by describing a coordination rule.

The invention according to claim 2 is the API coordination device according to claim 1, wherein the coordination rule includes a description of default values corresponding to the subset of the parameters, wherein the default values are to be used for complementation of the subset, and wherein the execution section is further configured to read the coordination rule and to launch the API published to the terminal device in such a way that, among the parameters for executing the coordinated service, those corresponding to the default values are hidden and the others of the parameters are published to the terminal device.

This configuration makes it possible to simplify the API by performing the complementation by the default values and to present only a simplified set of the parameters for executing the plurality of wholesale services to the terminal device of the service provider.

The invention according to claim 3 is the API coordination device according to claim 1, wherein the management section is further configured to hold a catalog in which the coordinated service combining the wholesale services of the plurality of wholesale providers is described as an item of the catalog, wherein the coordination rule further includes a description of a command associated with parameters corresponding to the coordinated service described as the item of the catalog, and wherein the execution section is further configured to, upon receipt from the terminal device of an order for execution of a coordinated service by the command, execute the coordinated service which is associated with the command described in the coordination rule via the parameters corresponding to the coordinated service.

With this configuration, the service provider can, in the event of executing the custom coordinated service combining the wholesale services of the plurality of wholesale providers from the terminal device, execute the coordinated service only by a simple operation of entering one command as the order.

The invention according to claim 4 is the API coordination device according to claim 1, wherein the management section is further configured to hold a catalog in which the coordinated service combining the wholesale services of the plurality of wholesale providers is described as an item of the catalog, wherein the coordination rule further includes a description of an execution sequence according to which the wholesale services of the coordinated service described as the item of the catalog are to be executed, the execution sequence being associated with a service editing process such as establishing a new coordination of wholesale services, modifying the wholesale services, and deleting the wholesale services, and wherein the execution section is further configured to, upon receipt from the terminal device of an order for the service editing process, execute the wholesale services of the coordinated service in order in accordance with the execution sequence associated with the service editing process, which is described in the coordination rule and corresponds to the order.

According to this configuration, the coordination rule includes a description of a custom coordinated service combining the wholesale services of the plurality of wholesale providers in a manner of being associated with the execution sequence of the wholesale services corresponding to a service editing process such as establishing a new coordination of wholesale services, modifying the wholesale services, and deleting the wholesale services. That means, it is possible to describe the execution sequence of the wholesale services according to the service editing process dynamically. With this description, the service provider merely makes a simply entry of an order for processing (e.g., setting up) of the wholesale services to execute the wholesale services of the coordinated service described as the item of the catalog in order in accordance with the sequence for the establishment described in the coordination rule.

The invention according to claim 5 is the API coordination device according to claim 1, wherein the management section is further configured to hold a catalog in which the coordinated service combining the wholesale services of the plurality of wholesale providers is described as an item of the catalog, wherein the coordination rule further includes a description of a second rule defining a synchronous dependency such that only when a certain one of the wholesale services has been executed, another one of the wholesale services is allowed to be executed and such that a response value out of an API execution of the certain one of the wholesale services is circulated as a parameter to an API execution of the another one of the wholesale services, and wherein the execution section is further configured to, upon receipt from the terminal device of an order for the coordinated service, execute the coordinated service in conformity with the second rule defining the synchronous dependency.

With this configuration, a person creating an adapter that associates the wholesale services of the wholesale providers need not be conscious of the execution sequence of the wholesale services. In addition, the service provider can cause an execution of the APIs of the wholesale services in a predetermined sequence without being conscious of the execution sequence of the wholesale services of the coordinated service.

The invention according to claim 6 is the API coordination device according to claim 5, wherein the coordination rule further includes a description of a third rule stipulating that the coordinated service associated with the item in the catalog be executed according to an asynchronous dependency such that certain ones of the wholesale services can be executed individually or in parallel, and wherein the execution section is further configured to, upon receipt from the terminal device of an order for the coordinated service, execute the coordinated service in conformity with the asynchronous dependency stipulated in the third rule.

With this configuration, it is possible to execute the wholesale services of the coordinated service according to the asynchronous dependency in addition to the synchronous dependency.

The invention according to claim 7 is the API coordination device according to claim 1, wherein the management section is further configured to hold a catalog in which the coordinated service combining the wholesale services of the plurality of wholesale providers is described as an item of the catalog, wherein the coordination rule further includes a description of a fourth rule stipulating that the coordinated service associated with the item in the catalog be executed in such a way that a response value in the event of executing one of the wholesale services of the coordinated service is set as a parameter to another one of the wholesale services of the coordinated service in the event of executing the another one and thereby complementation of the parameter is performed, and wherein the execution section is further configured to, in the event of executing the wholesale services of the coordinated service associated with the item in the catalog, execute the wholesale services according to the complementation stipulated in the fourth rule.

With this configuration, a person creating an adapter that associates the wholesale services of the wholesale providers can cause an execution of the wholesale services without being conscious of the coordination of the response values.

Operational Advantages of Invention

According to the present invention, it is possible to simplify the API through which a coordinated service combining wholesale services of a plurality of wholesale service providers is published to service providers, wherein the wholesale services provide communications services.

Further, it is possible to dynamically coordinate APIs published by the wholesale service providers.

MODES FOR CARRYING OUT THE INVENTION

Hereinafter, an embodiment of the present invention is described with reference to the drawings.

Configuration of Embodiment

Figure 1:
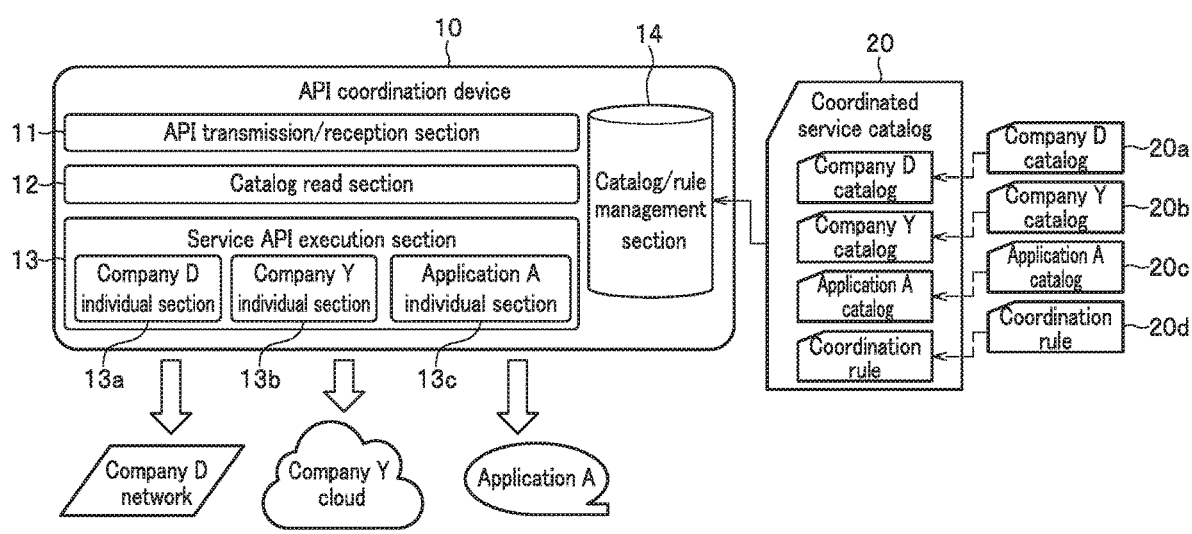
FIG. 1 is a block diagram illustrating a configuration of an API coordination device according to an embodiment of the present invention.

FIG. 1 is a block diagram illustrating a configuration of an API coordination device according to an embodiment of the present invention.

When a plurality of wholesale providers provides to a service provider a coordinated service combining a network, cloud, and application, which are wholesale services (sometimes referred to as services), the API coordination device 10 illustrated in FIG. 1 provides simplification of an API publishing the services to the service provider and provides dynamic coordination of the APIs via which the plurality of wholesale providers publish the services.

The API coordination device 10 includes an API transmission/reception section 11, a catalog read section (also referred to as a read execution section) 12, a service API execution section (also referred to as an API execution section) 13, and a catalog/rule management section (also referred to as a management section) 14. The API execution section 13 includes a plurality of individual sections each holding services provided by each wholesale provider. The plurality of individual sections includes a Company D individual section 13*a*, a Company Y individual section 13*b*, and an Application A individual section 13*c*. The catalog read section 12 and the service API execution section 13 constitute the execution section described in the claims.

The catalog/rule management section 14 holds a coordinated service catalog (also referred to as coordination catalog) 20. The coordinated service catalog 20 stores a catalog in which specifications of the wholesale services providing communications services are described and describes coordination rules that specify the coordination of communication services. In this example, the coordination catalog 20 includes a Company D catalog 20a, a Company Y catalog 20b, an Application A catalog 20c, and a coordination rule 20d. This management section 14 has a syntax check function that checks whether the data structures or the like of the catalogs and rules included in the coordination catalog 20 are correct, a notification function for communicating an update of resources, and a filter search function that handles requests for retrieving data of catalogs and coordination rules.

The API transmission/reception section 11 is a functional section that transmits/receives messages to/from APIs published to service providers. It has a function of checking the format of API messages received from a terminal device 32, which is a personal computer or the like of a service provider, a function of launching the read execution section 12, a function of retrieving resources from the management section 14, a function of creating and transmitting notification information to the terminal devices of service providers, and a function of outputting access logs.

The read execution section 12 retrieves catalogs and coordination rules from the management section 14 according to an order for a coordinated service, which order is received from a service provider, and reads from the retrieved catalogs the specifications of the wholesale services providing communications services. The order is placed by selection or designation of a command of the below-described parameters on the terminal device 32 (see FIG. 2) of the service provider.

The read execution section 12 is a functional section that reads rules for coordinating communication services from the retrieved coordination rules and places an instruction for executing a service in accordance with the read result to the API execution section 13. The read execution section 12 further has functions for performing: decomposition of the user request in accordance with the rule definitions, parameter completion, instruction for execution by the API execution section 13, aggregation of the results of the reading, instructions for coordination in accordance with the rule definitions, and update of the management section 14.

The API execution section 13 is a functional section that controls execution of the APIs published by the wholesale providers in response to a request from the read execution section 12. The API execution section 13 has a function of checking launch conditions of wholesale provider APIs, an API execution function, and an API response read function.

Next, a description will be given of the API coordination function of the API coordination device 10 of the present embodiment. This API coordination function includes the following four Functions 1 to 4.

Function 1: A function for carrying out simplification of APIs for service providers and complementation of the simplified APIs using the coordination rules Function 2: A function for carrying out control of a dynamic execution sequence of the wholesale services of the wholesale providers using the coordination rules Function 3: A function for carrying out control of synchronous and asynchronous executions of the wholesale services of the wholesale providers using the coordination rules Function 4: A function for carrying out complementation of dynamic setting values using the coordination rules in the event of executing APIs of the wholesale services of the wholesale providers Firstly, a description will be given of Function 1. The coordination catalog 20 held by the management section 14 is provided in combination with the coordination rule 20d1 presented as an example in FIG. 2. Function 1 is characterized in that the coordination rule 20d1 describes information necessary for default value completion (described below) or conditional propagation control (described below) to carry out the simplification of APIs for service providers. The description of default value completion is the first feature of Function 1; and the description of conditional propagation control is the second feature of Function 1.

A description will be given of the first feature of Function 1. As an example, assume that a cloud service of Company Y takes the six parameters indicated by P1, P2, P3, P4, P5, and P6 in box 31 in FIG. 2. The parameters P1, P2, P3, P4, P5, and P6 indicate an "instance type" of service, an "instance count", a "block device size", a "block device name", a "flag indicative of device encryption enable/disabled", and a "region", respectively. Hereinafter, the parameters P1 to P6 may be sometimes represented respectively by P1 to P6, i.e., by reference sign only.

Here, the API simplification means to perform a process for hiding some of all the parameters used for executing a service of a wholesale provider and causing the terminal device of a service provider to present only the other parameters. For example, an example of API simplification is to, rather than causing the terminal device 32 to present all the six parameters P1 to P6, hide P4 to P6, i.e., the latter half three of the six parameters P1 to P6, from the terminal device 32 of the service provider and cause the terminal device 32 to present P1 to P3 only, i.e., the former half three of the six parameters. This simplification rule (first rule) is described in the coordination rule 20d1. The read execution section 12 reads this rule and instructs the API transmission/reception section 11 to provide the wholesale service to the service provider in accordance with the read rule.

Figure 2:
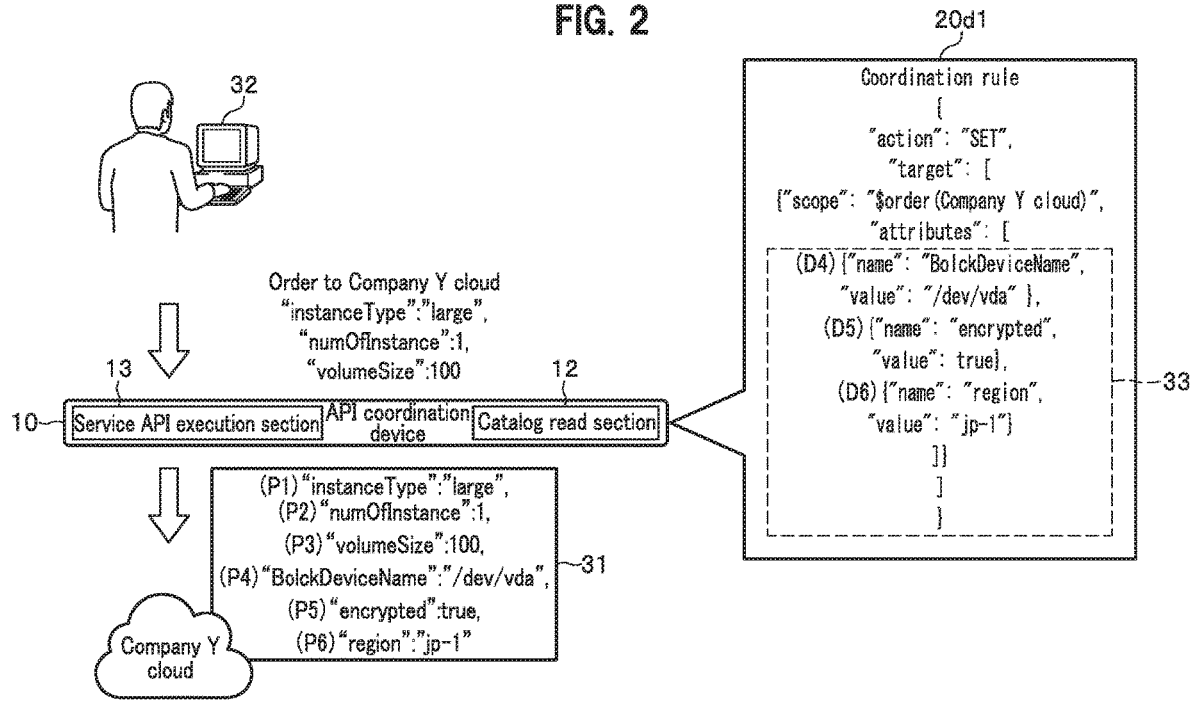
FIG. 2 is an explanatory diagram for explaining the first feature of API coordination function 1 of the API coordination device of the present embodiment.

To carry out the API simplification, the coordination rule 20d1 describes default values (specified values) D4, D5, and D6, as illustrated in dashed line box 33 in FIG. 2. The default values D4 to D6 corresponds to the parameters P4 to P6 and are used to carry out the above-described default value completion, which causes hiding the latter half three P4 to P6 and presenting the former half three P1 to P3 only. As a result of the API simplification by this default value completion, only the former half three parameters P1 to P3 of the service are presented on the terminal device 32 of the service provider.

When an order is placed on the terminal device 32 of the service provider to execute the service by specifying the three parameters P1 to P3, an order for executing the wholesale service of the Company Y cloud is transmitted to the API coordination device 10.

When the order has been transmitted, the read execution section 12 reads from the coordination rule 20d1 that the three hidden parameters P4 to P6, which are subordinate to the three parameters P1 to P3 of the order, should be complemented with the three default values D4 to D6 corresponding to the parameters P4 to P6. The read execution section 12 instructs the API execution section 13 so that the service will be executed in accordance with the read content. The API execution section 13 launches the API of the wholesale service of the Company Y cloud in accordance with the instruction. Incidentally, the coordination rules of default value completion may be stored in a certain number of files for each company like the companies Y and X, which are wholesale providers.

Next, a description will be given of the second feature of Function 1. Below, we describe that API simplification for a service provider as being carried out by specifying propagation conditions for the below-described conditional propagation control in the coordination rule 20*d*2 as illustrated in FIG. 3.

The conditional propagation control allows a service provider to execute a custom coordinated service (also referred to as a custom service), which is a combination of services of a plurality of wholesale providers, by inputting only one command as an order. To be more specific, propagation conditions associated with an order command are described in the coordination rule 20*d*2. In the event of an order command being inputted by the service provider, on the basis of a plurality of parameters of propagation conditions corresponding to this command, the order command is propagated to a plurality of services which are to be combined, and thereby a custom service made by combining the services to which the order command is propagated is executed. In this way, the conditional propagation control is performed.

Figure 3:
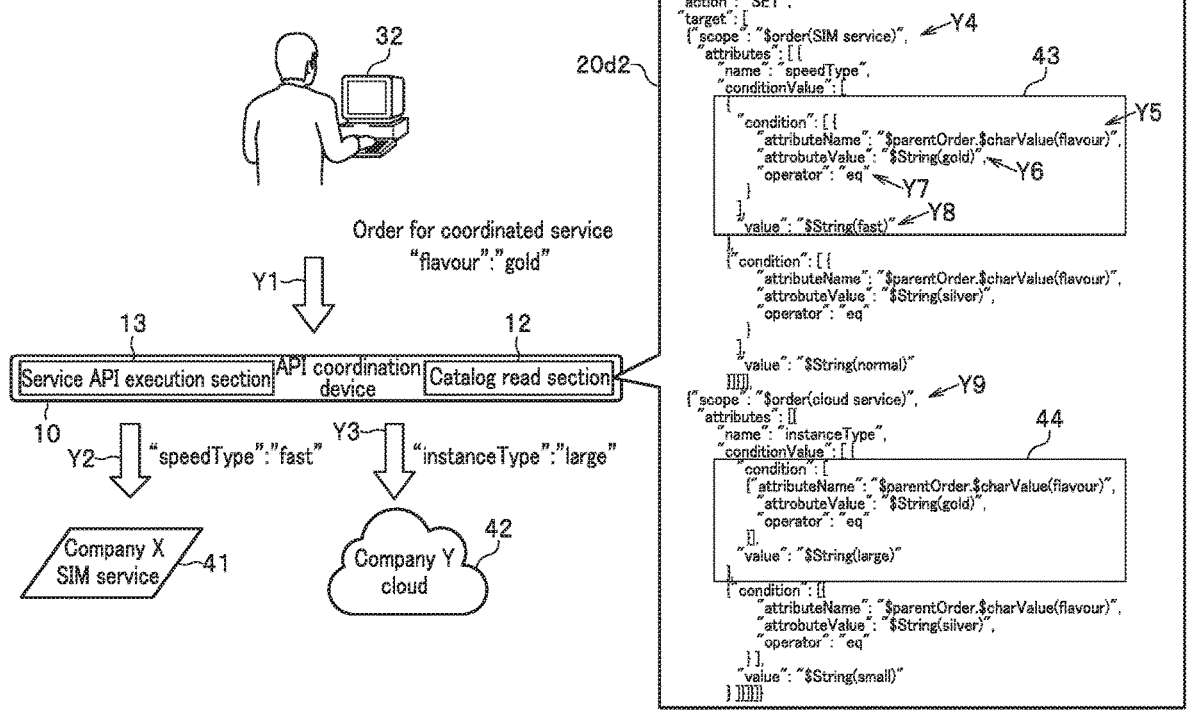
FIG. 3. is an explanatory diagram for explaining the second feature of API coordination function 1 of the API coordination device of the present embodiment.

A description will be given of the conditional propagation control in a case in which a service provider executes a custom service combining a SIM service 41 of Company X, which is a wholesale provider, and a cloud service 42 of Company Y, which are illustrated in FIG. 3.

The API coordination device 10 makes in advance a catalog in which a coordinated service combining the SIM service 41 of Company X and the cloud service 42 of Company Y is described as an item of the catalog. The API coordination device 10 holds the catalog in the management section 14. For the SIM service 41, a type of communication bandwidth at the time of providing the service is set; and, for the cloud service 42, an instance type is set. The type of bandwidth and the instance type are combined for simplification. The service provider is allowed to place an order according to this simplification.

To combine the SIM service 41 of Company X and the cloud service 42 of Company Y, the API coordination device 10 selects a combination of the parameter "speedType": "fast" corresponding to the SIM service 41 and the parameter "instanceType": "large" corresponding to the cloud service 42 and executes the combined service. A flow to the SIM service 41 is indicated by arrow Y2; and a flow to the cloud service is indicated by arrow Y3.

In this event, the service provider can place an order only by inputting (or selecting) a command "gold" on the terminal device 32, in order to cause the parameters "fast" and "large" to be selected. The placing of the order is indicated by arrow Y1. Such conditional propagation control is controlled using the coordination rule 20*d*2.

In the description of the coordination rule 20*d*2, the block starting with {"scope": "$order (SIM service)", which is indicated by arrow Y4, defines the first propagation condition shown in box 43, in which "attributeName" is specified as "flavour" (indicated by arrow Y5), "attributeValue" is specified as "gold" (indicated by arrow Y6), "operator" is specified as "eq" (indicated by arrow Y7), and "value" is specified as "$String (fast)" (indicated by arrow Y8). This defines a rule stipulating that in the SIM service, if the attribute "flavour" is equal ("eq") to an order command "gold", the parameter "fast" be used.

The block starting with {"scope": "$order (cloud service)", which is indicated by arrow Y9, defines a second propagation condition shown in box 44, in which "attributeName" is specified as "flavour", "attributeValue" is specified as "gold", "operator" is specified as "eq", and "value" is specified as "$String (large)". This defines a rule stipulating that in the cloud service, if the attribute "flavour" is equal ("eq") to an order command "gold", the parameter "large" be used.

With this coordination rule 20*d*2, the following operation can be executed. When a service provider places an order by selecting and inputting a command "gold" on the terminal device 32, the read execution section 12 reads, from the coordination rule 20*d*2, that the parameters "fast" and "large" corresponding to the command "gold" should be selected. The read execution section 12 instructs the API execution section 13 to execute a coordinated service described in the catalog held in the management section 14 in accordance with the read result. The API execution section 13 launches the SIM service 41 of Company X corresponding to the parameter "fast" and launches an API of the cloud service 42 of Company Y corresponding to the parameter "large", in response to the instruction.

Next, a description will be given of the control of dynamic execution sequence (dynamic execution sequence control) of wholesale services of wholesale providers. The control is achieved using the coordination rule of Function 2.

The dynamic execution sequence control dynamically controls the sequence of execution of services of a plurality of wholesale providers. This dynamic execution sequence control includes: determining the execution sequence of the services in response to the processing to be made to the services, such as establishing a new coordination of services, modification of a service, and deletion of a service; describing the execution sequence in the coordination rules; and executing the services. The API coordination device 10 makes a catalog of coordinated services in which the Company D network, the Company Y cloud, and the Application A are coordinated and holds the catalog in the management section 14.

Figure 4:
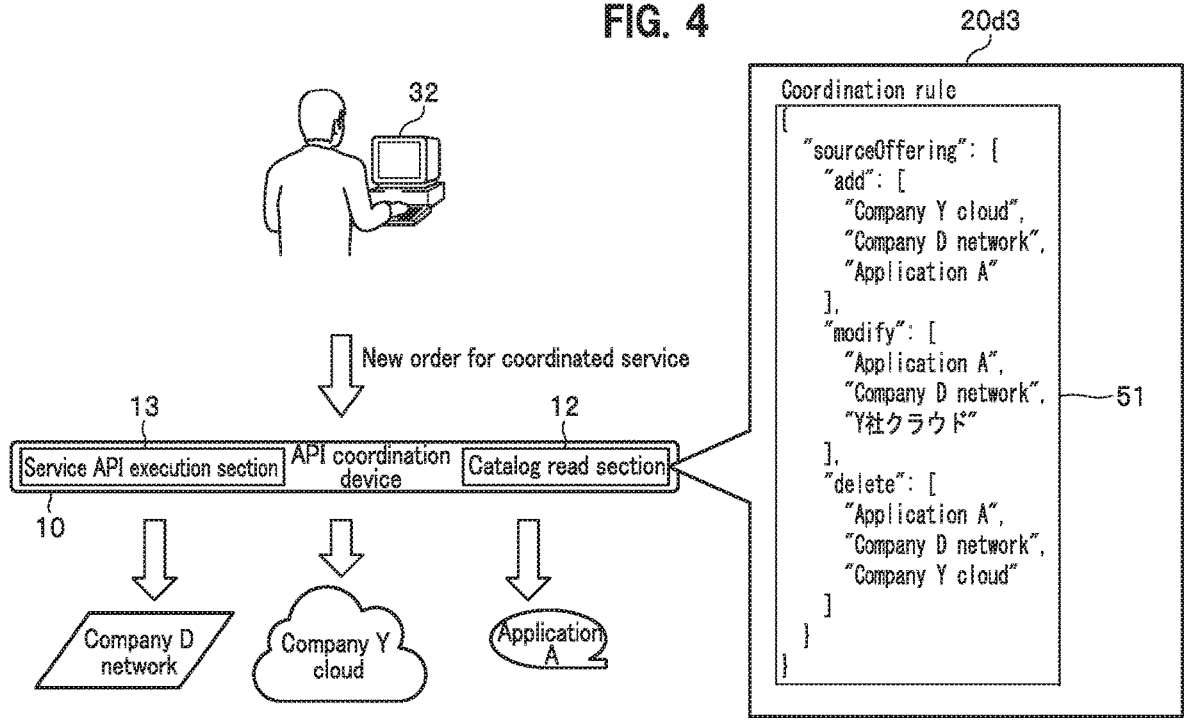
FIG. 4 is an explanatory diagram for explaining API coordination function 2 of the API coordination device of the present embodiment.

Box 51 in the coordination rule 20*d*3 illustrated in FIG. 4 states a rule "add", which stipulates an execution sequence for establishing a new service. The rule "add" specifies that the services of the Company Y cloud, Company D network, and Application A should be executed in this sequence. A rule "modify" stipulates an execution sequence for modifying a service. The rule "modify" specifies that the services of the Application A, Company D network, and Company Y cloud should be executed in this sequence. A rule "delete" stipulates an execution sequence for deleting a service. The rule "delete" specifies that the services of the Application A, Company D network, and Company Y cloud should be executed in this sequence.

With this coordination rule 20*d*3, when a service provider using the terminal device 32 places an order for establishing a new service, the read execution section 12 reads the rule "add" corresponding to the establishment from the coordination rule 20*d*3. The read execution section 12 instructs the API execution section 13 so that the services for the coordinated service described as an item of the catalog held in the management section 14 will be executed in the sequence of the establishment, in accordance with the read content. The API execution section 13 launches the APIs of the Company Y cloud, Company D network, and Application A in this sequence, in response to the instruction. Also in a case of modification and in a case of deletion, APIs are launched in accordance with the execution sequence specified in the coordination rule 20*d*3.

Next, a description will be given of the control of synchronous and asynchronous executions of wholesale services of wholesale providers. The control is achieved using the coordination rule of Function 3.

For a synchronous execution of wholesale services of a plurality of wholesale providers, a synchronous dependency between the wholesale services is defined. An example of the synchronous dependency is such that only when a certain one of the wholesale services has been executed, another one of the wholesale services can be executed. A rule for executing services in conformity with this synchronous dependency (second rule) is described in the coordination rule. The API coordination device 10 makes a catalog of coordinated services, in which the services of the wholesale providers are coordinated, and holds the catalog in the management section 14.

For an asynchronous execution of wholesale services of a plurality of wholesale providers, an asynchronous dependency between the wholesale services is defined. An example of the asynchronous dependency is such that certain ones of the wholesale services can be executed individually or in parallel. A rule for executing services in conformity with this asynchronous dependency (third rule) is described in the coordination rule. An example of services being subject to this asynchronous execution is illustrated as services 1, 4, and 6 in FIG. 5.

Figure 5:
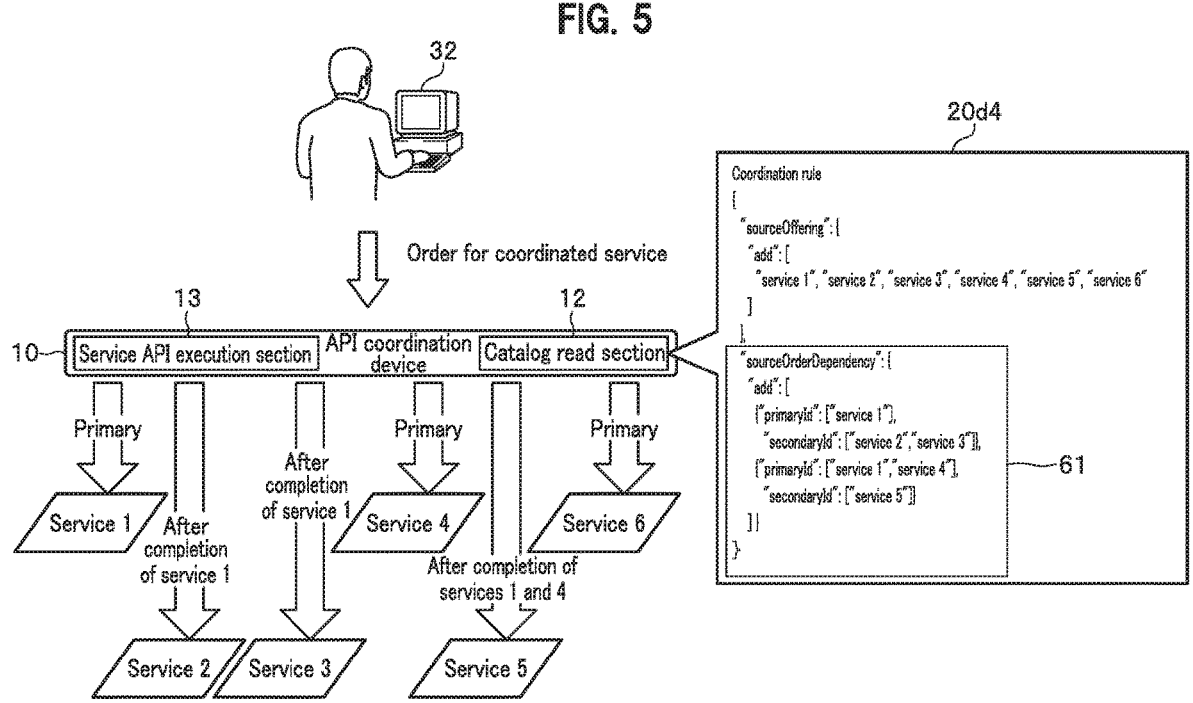
FIG. 5 is an explanatory diagram for explaining API coordination function 3 of the API coordination device of the present embodiment.

Now, as illustrated in FIG. 5, assume that there are six services 1, 2, 3, 4, 5, and 6 as wholesale services to be executed by the API coordination device 10. The API coordination device 10 makes a catalog of coordinated services, in which the services 1 to 6 are coordinated, and holds the catalog in the management section 14.

An example of a rule for synchronous execution of the wholesale services is described in box 61 of the coordination rule 20d4 illustrated in FIG. 5 as follows:

The statement {"primaryId": ["service 1"], "secondaryId": ["service 2", "service 3"]}, stated after "add" representing coordination of services, describes a synchronous dependency rule stipulating that the services 2 and 3 can be executed only after executing the service 1.

The statement {"primaryId": ["service 1", "service 4"], "secondaryId": ["service 5"]} describes a synchronous dependency rule stipulating that the service 5 can be executed only after executing the services 1 and 4.

According to this coordination rule 20d4, when a service provider places an order using a command involving a service synchronous execution from the terminal device 32, the read execution section 12 reads the rule for the synchronous execution from the coordination rule 20d3. The read execution section 12 instructs, in accordance with the read content, the API execution section 13 to execute the coordinated service described in the catalog held in the management section 14 in conformity with the synchronous execution rule in the read content. The API execution section 13 launches service APIs in accordance with the synchronous execution rule in response to the instruction.

Next, a description will be given of the complementation of dynamic setting values (setting-value dynamic completion) in the event of an execution of APIs of wholesale services of wholesale providers. The complementation is achieved using the coordination rule of Function 4.

The setting-value dynamic completion means complementation that sets the value of the response in the event of an execution of an API of a certain wholesale service as the value of a parameter in the event of execution of an API of another wholesale service. For the setting-value dynamic completion, the coordination rule includes a rule (fourth rule) that the value of the response in the event of an execution of the API of the certain wholesale service be circulated to be set as the value of the parameter in the event of an execution of the API of the other wholesale service.

Figure 6:
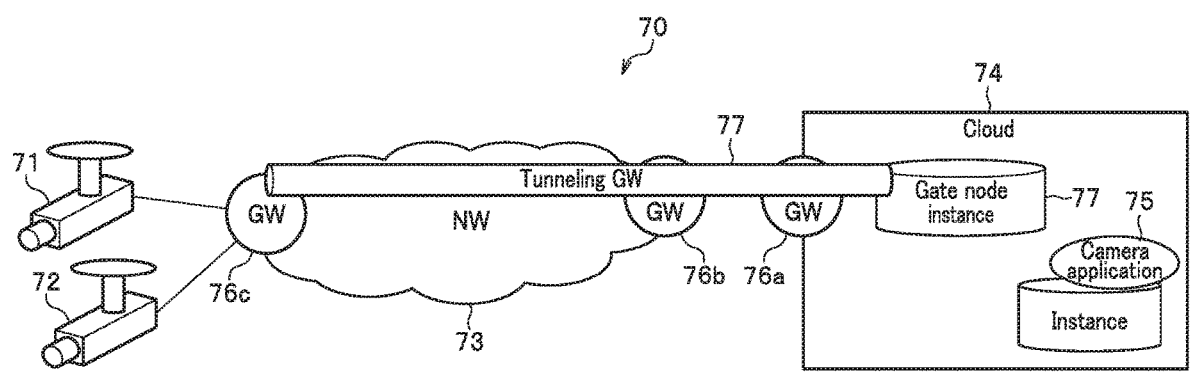
FIG. 6 is the first explanatory diagram for explaining API coordination function 4 of the API coordination device of the present embodiment.

Now, as an example, assume that a camera system 70 that launches surveillance cameras 71 and 72 is built using a camera application 75 on a cloud 74 connected to the cameras 71 and 72 via network (NW) 73 as illustrated in FIG. 6. This system is built upon API coordination by the API coordination device 10.

The camera application 75 is configured as an instance of virtual computer which is launched as software on a physical computer. The camera application 75 is connected with a gateway (GW) 76a of the cloud 74 via a gate node instance 77. The cameras 71 and 72 are connected with the camera application 75 on the cloud 74 via the NW 73. This connection is established through a tunneling GW 77 configured through the GWs 76b and 76c located on opposite sides of the NW 73 and through the GW 76a of the cloud 74. The tunneling GW 77 transmits packets.

Figure 7:
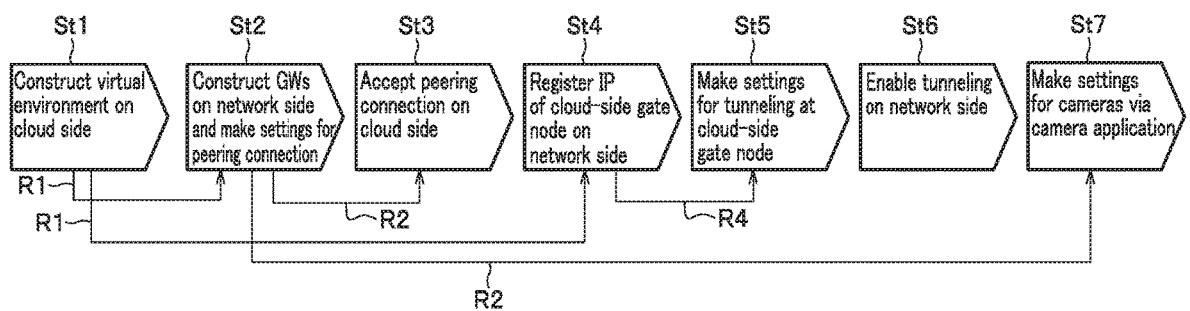
FIG. 7 is the second explanatory diagram for explaining API coordination function 4 of the API coordination device of the present embodiment.

A description will be given of an execution of an API of a service for configuring such a camera system 70, with reference to the sequence diagram illustrated in FIG. 7.

In step St1, an API for constructing an execution environment is executed to construct a virtual environment of the camera application on the cloud 74. This virtual environment is constructed on the cloud 74, with the camera application 75 being connected to the GW 76a via the gate node 77. Now, assume that a response value R1 is determined in the event of the execution of this API.

In step St2, an API for constructing the GWs 76b and 76c on the NW 73 and making settings for a peering connection is executed using the response value R1. Assume that a response value R2 is determined in the event of this API execution. Note that a peering connection means a connection environment in which internet service providers mutually connect their networks to exchange traffic with each other.

In step St3, an API for accepting the peering connection on the side of cloud 74 is executed using the above-described response value R2.

In step St4, an API for registering the IP of the cloud-74-side gate node 77 on the side of the NW 73 is executed using the above-described response value R1. Assume that a response value R4 is determined in the event of this API execution.

In step St5, an API for setting the tunneling GW 77 is executed using the above-described response value R4 on the cloud-74-side gate node 77.

In step St6, an API for enabling the tunneling GW 77 is executed on the side of NW 73.

In step St7, an API for making settings to the cameras 71 and 72 using the above-described response value R2 via the camera application 75 is executed.

A description will be given of a coordination rule for executing such service APIs for constructing the camera system 70 with reference to FIG. 8. The description will be given with reference to the descriptions of the above-described API executions in steps St1 to St3.

Figure 8:
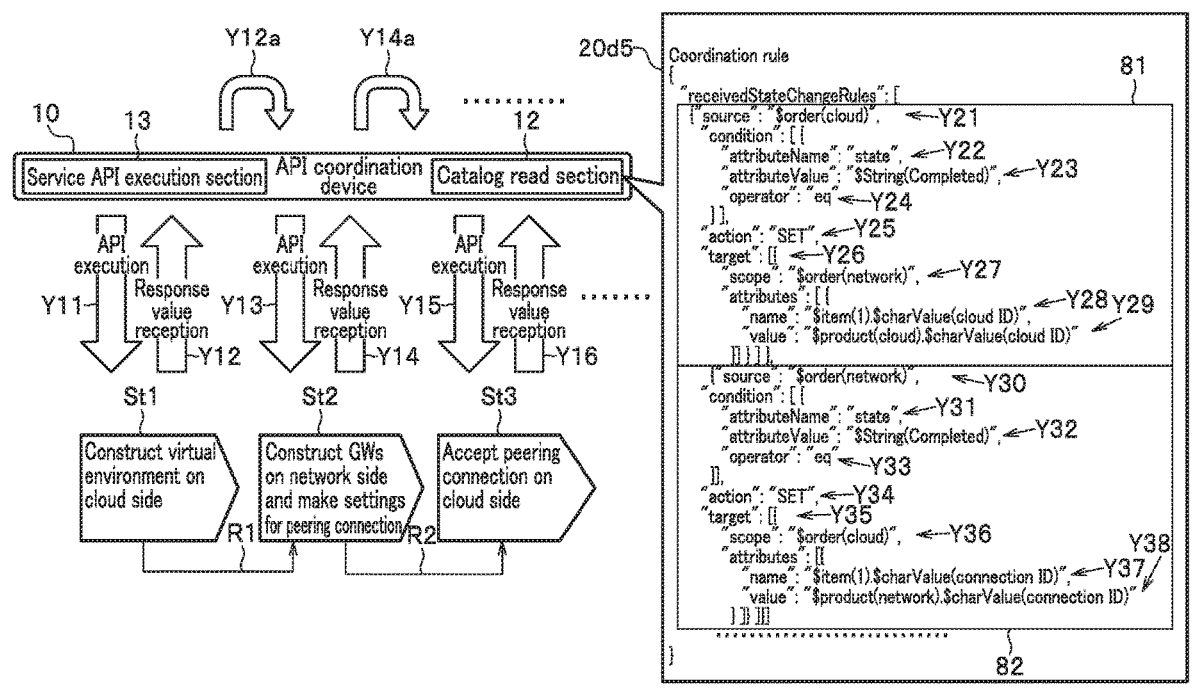
FIG. 8 is the third explanatory diagram for explaining API coordination function 4 of the API coordination device of the present embodiment.

Box 81 in the coordination rule 20d5 illustrated in FIG. 8 describes a rule (referred to as a first rule) for executing an API for constructing an execution environment to construct the virtual environment of the camera application on the cloud 74 in step St1. Described in box 82 is a rule (referred to as a second rule) for executing an API for constructing the GWs 76b and 76c on the side of the NW 73 and making settings for the peering connection.

The read execution section 12 of the API coordination device 10 reads the coordination rule 20d5 including the first and second rules and instructs the API execution section 13 to execute the APIs.

The API execution section 13 performs an API execution in accordance with the first rule. This execution is illustrated as arrow Y11 in FIG. 8. As a result of this execution, an execution environment constituting the virtual environment of the camera application is constructed on the cloud 74 in step St1. The response value R1 generated in the event of this construction is transmitted to the API execution section 13. This is illustrated as arrow Y12. The API execution section 13 informs the NW 73 of the cloud ID (identifier) of the cloud 74 in response to the response value R1. This is illustrated as arrow Y12a.

Now we describe this processing in reference to the first rule described in box 81. When the "state" (see arrow Y22) of "cloud" (indicated by arrow Y21) is equal (see "eq" indicated by arrow Y24) to "Completed" (see arrow Y23), an action of setting (see "SET" indicated by arrow Y25) is performed. Next, the cloud ID (see arrow Y29) from the cloud is set to the place for a cloud ID (see arrow Y28) to be associated with an order (see "target" indicated by arrow Y26) which is to be placed to the network (see arrow Y27).

The API execution section 13 carries out an API execution in accordance with the second rule. This is illustrated by arrow Y13 in FIG. 8. As a result of this execution, the GWs 76b and 76c are constructed on the side of the NW 73 in step St2 using the response value R1 and thereby the peering connection is established. The response value R2 generated in this establishment is transmitted to the API execution section 13. This is illustrated by arrow Y14. The API execution section 13 informs the cloud 74 of the connection ID according to the response value R2. This is illustrated by arrow Y14a.

Now we describe this processing in reference to the second rule described in box 82. When the "state" (see arrow Y31) of "network" (indicated by arrow Y30) is equal (see "eq" indicated by arrow Y33) to "Completed" (see arrow Y32), an action of setting (see "SET" indicated by arrow Y34) is performed. Next, the connection ID (see arrow Y38) from the network is set to the place for a connection ID (see arrow Y37) to be associated with an order (see "target" indicated by arrow Y35) which is to be placed to the cloud (see arrow Y36).

Examples of description in the coordination rule 20d5 regarding the API execution henceforth is omitted. The API execution section 13 executes an API on the cloud side to accept the peering connection. This is illustrated by arrow Y15 in FIG. 8. As a result of this execution, the acceptance of the peering connection is performed on the side of cloud 74 in step St3 using the response value R2. The response value generated in this acceptance is transmitted to the API execution section 13. This is illustrated by arrow Y16.

Operation of the Embodiment

Next, a description will be given of the operation of API coordination by the API coordination device 10 according to the present embodiment, in reference to the sequence diagrams in FIGS. 9 to 11.

Figure 9:
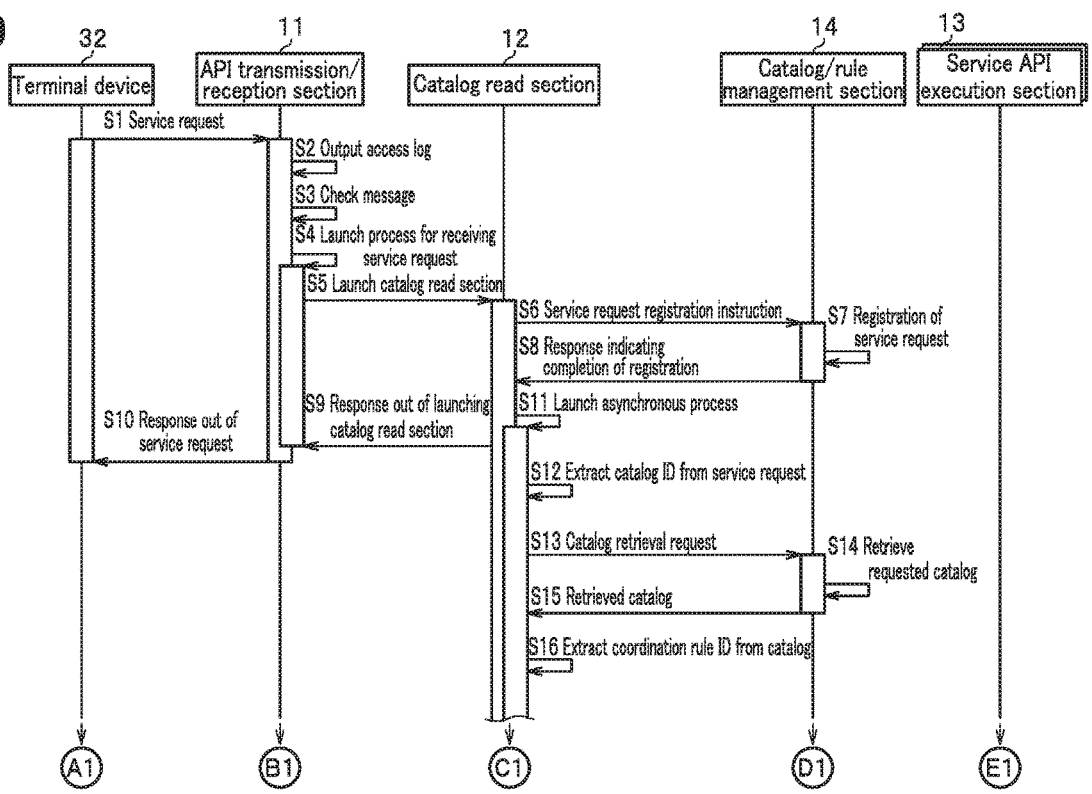
FIG. 9 is the first sequence diagram for explaining operations of the API coordination of the API coordination device according to the present embodiment.

In step S1, illustrated in FIG. 9, the terminal device 32 of the service provider places a service request to the API coordination device 10 (see FIG. 1). This service request is an order, for example, for coordination of wholesale services of a plurality of wholesale providers and is executed using the commands described above in the description of Functions 1 to 4.

An API transmission/reception section (also referred to as a transmission/reception section) 11 outputs an access log in the event of acceptance of the service request at step S2 and checks the message of the service request at step S3. After this checking, the transmission/reception section 11 launches a service request reception process at step S4 and launches the read execution section 12 at step S5.

At step S6, the read execution section 12 instructs the management section 14 to register the service request. The management section 14 registers the service request in response to the instruction at step S7 and outputs a response indicating completion of the registration to the read execution section 12 at step S8. The read execution section 12 having received this response returns a launch response to the transmission/reception section 11 at step S9. The transmission/reception section 11 having received this launch response returns, at step S10, a response that informs the terminal device 32 that the API coordination device 10 has accepted the service request.

Meanwhile, the read execution section 12, which has received the response indicating the completion of registration of the service request at step S8, launches an asynchronous process of Function 3 described above, at step S11. Subsequent to this launch, at step S12, the read execution section 12 extracts a catalog ID from the information in the service request and, at step S13, requests the management section 14 to retrieve the catalog corresponding to the extracted catalog ID.

At step S14, the management section 14 searches for a catalog according to the retrieval request. When found, at step S15, the management section 14 outputs the found catalog to the read execution section 12 as the response to the retrieval request. At step S16, the read execution section 12 extracts a coordination rule ID from the found catalog.

Figure 10:
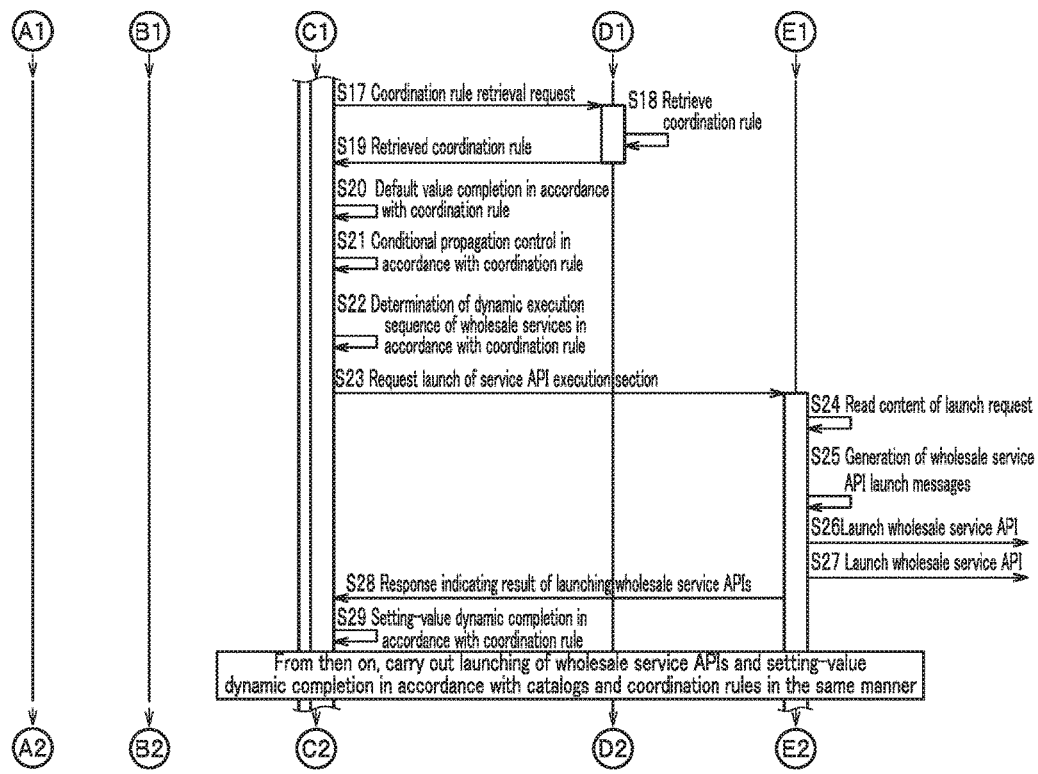
FIG. 10 is the second sequence diagram for explaining the operations of the API coordination of the API coordination device according to the present embodiment.

Proceeding to FIG. 10, subsequent to this extraction, the read execution section 12 requests the management section 14 to retrieve the coordination rule at step S17. The management section 14, at step S18, searches for the coordination rule which is requested to be retrieved. When found, at step S19, the management section 14 outputs the found coordination rule to the read execution section 12 as the response to the retrieval request.

The read execution section 12 carries out, at step S20, the default value completion, which is the first feature of Function 1 described above, in accordance with the retrieved coordination rule described above. Further, at step S21, the read execution section 12 carries out the conditional propagation control, which is the second feature of Function 1, in accordance with the retrieved coordination rule. Further, at step S22, the read execution section 12 determines the dynamic execution sequence of the wholesale services, according to the feature of Function 2, in accordance with the retrieved coordination rule.

Further, at step S23, the read execution section 12 requests the service API execution section 13 to perform launch operations. At step S24, the API execution section 13 reads the content of the launch request in response to this request and, at step S25, generates API launch messages of the wholesale services. After this generation of the API launch messages, the API execution section 13 launches a plurality of wholesale services at steps S26 and S27.

At step S28, the API execution section 13 outputs the responses obtained as the results of launching the wholesale service APIs to the read execution section 12. The read execution section 12 having received these responses, at step S29, carries out the setting-value dynamic completion, described above as Function 4, in accordance with the coordination rule.

From then on, the API coordination device 10 carries out launching of service APIs and the setting-value dynamic completion in accordance with the catalogs and coordination rules in the same manner.

Figure 11:
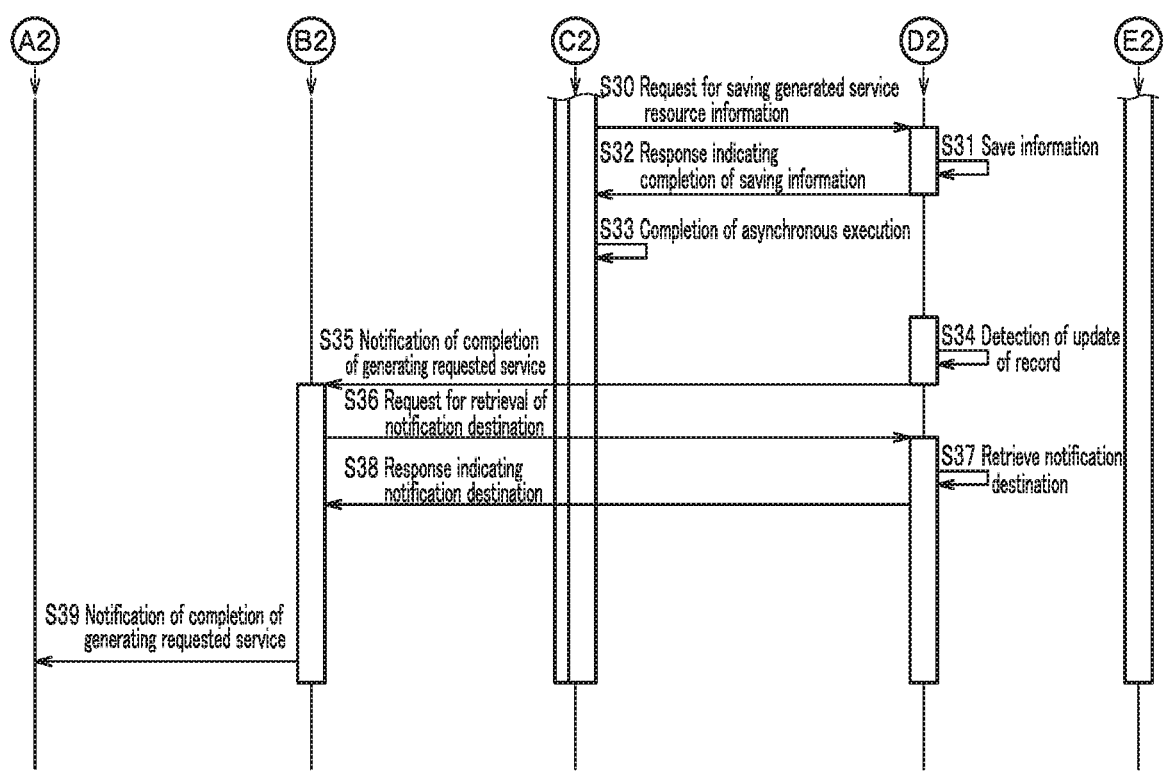
FIG. 11 is the third sequence diagram for explaining the operations of the API coordination of the API coordination device according to the present embodiment.

Proceeding to FIG. 11, at step S30, the read execution section 12 requests the management section 14 to save service resource information generated in relation to the launching of the wholesale service APIs at steps S26 and S27. The management section 14, at step S31, saves the service resource information requested to be saved, and at step S32, outputs to the read execution section 12 a response indicating completion of saving the information.

Now, assume that the asynchronous execution has been completed by the read execution section 12 at step S33. Further, assume that, at step S34, the management section 14 has detected an update of a record pertaining to the catalogs and coordination rules. After this detection, at step S35, the management section 14 informs the transmission/reception section 11 that the generation of the service requested from the terminal device 32 has been completed.

At step S36, the transmission/reception section 11 requests the management section 14 to retrieve the notification destination to which the completion of the service generation at step S35 should be communicated. The management section 14 searches for the notification destination in response to the retrieval request at step S37 and returns the retrieved notification destination to the transmission/reception section 11 at step S38. The transmission/reception section 11 notifies the returned notification destination, i.e., the terminal device 32, that the generation of the requested service has been completed, at step S39.

Operational Advantages of the Embodiment

A description will be given of operational advantages of the API coordination by the API coordination device 10 according to the present embodiment. The API coordination device 10 is configured to execute a coordinated service combining wholesale services of a plurality of wholesale providers by launching an API published to a terminal device 32 of a service provider and by launching, in response to an order from the terminal device 32, APIs through which the plurality of wholesale providers publish the wholesale services, the wholesale services providing communications services.

(1) The API coordination device 10 includes a management section 14 configured to hold a coordination rule 20*d*1 including a first rule defining API simplification which is to be performed in such a way that, among parameters for executing the coordinated service, a subset of the parameters is hidden and the others of the parameters are published to the service provider. The API coordination device 10 further includes an execution section composed of a read execution section 12 and an API execution section 13, which are configured to read the first rule held by the management section 14 and launch the API published to the terminal device 32 in such a way as to hide the subset of the parameters for executing the coordinated service and publish the others of the parameters to the terminal device 32.

This configuration makes it possible to present a simplified set of the parameters for executing a plurality of wholesale services to the terminal device 32 of the service provider. Thus, the configuration makes it easy for the service provider to set parameters in the event of placing an order. In addition, the configuration makes it possible to create flexible services menus in such a manner as to allow a certain service provider to make detailed settings and allow another service provider to make simplified settings, only by describing a coordination rule.

(2) A coordination rule 20*d*2 includes a description of default values corresponding to the subset of the parameters. The default values are to be used for complementation of the subset. The execution section (read execution section 12 and API execution section 13) is further configured to read the coordination rule and to launch the API published to the terminal device 32 in such a way that, among the parameters for executing the coordinated service, those corresponding to the default values are hidden and the others of the parameters are published to the terminal device 32.

This configuration makes it possible to simplify the API by performing the complementation by the default values and to present only a simplified set of the parameters for executing the plurality of wholesale services to the terminal device 32 of the service provider.

(3) The management section 14 is further configured to hold a catalog in which the coordinated service combining the wholesale services of the plurality of wholesale providers is described as an item of the catalog. The coordination rule 20*d*2 further includes a description of a command associated with parameters corresponding to the coordinated service described as the item of the catalog. The execution section is further configured to, upon receipt from the terminal device 32 of an order for execution of a coordinated service by the command, execute the coordinated service which is associated with the command described in the coordination rule via the parameters corresponding to the coordinated service.

With this configuration, the service provider can, in the event of executing the custom coordinated service combining the wholesale services of the plurality of wholesale providers from the terminal device 32, execute the coordinated service only by a simple operation of entering one command as the order.

(4) The management section 14 is further configured to hold a catalog in which the coordinated service combining the wholesale services of the plurality of wholesale providers is described as an item of the catalog. A coordination rule 20*d*3 includes a description of an execution sequence according to which the wholesale services of the coordinated service described as the item of the catalog are to be executed, the execution sequence being associated with a service editing process such as establishing a new coordination of wholesale services, modifying the wholesale services, and deleting the wholesale services. The execution section is further configured to, upon receipt from the terminal device 32 of an order for the service editing process, execute the wholesale services of the coordinated service in order in accordance with the execution sequence associated with the service editing process, which is described in the coordination rule and corresponds to the order.

According to this configuration, the coordination rule includes a description of a custom coordinated service combining wholesale services of the plurality of wholesale providers in a manner of being associated with the execution sequence of the wholesale services corresponding to a service editing process, such as establishing a new coordination of wholesale services, modifying the wholesale services, and deleting the wholesale services. That means, it is possible to dynamically describe the execution sequence of the wholesale services according to the service editing process. With this description, the service provider is required to only make a simple entry of an order for processing (e.g., establishment) of the wholesale services to execute the wholesale services of the coordinated service described as the item of the catalog in order in accordance with the sequence for establishment described in the coordination rule.

(5) The management section 14 is further configured to hold a catalog in which the coordinated service combining the wholesale services of the plurality of wholesale providers is described as an item of the catalog. A coordination rule 20d4 includes a description of a second rule defining a synchronous dependency such that only when a certain one of the wholesale services has been executed, another one of the wholesale services is allowed to be executed and such that a response value out of an API execution of the certain one of the wholesale services is circulated as a parameter to an API execution of the another one of the wholesale services. The execution section is further configured to, upon receipt from the terminal device 32 of an order for the coordinated service, execute the coordinated service in conformity with the second rule defining the synchronous dependency.

With this configuration, a person creating an adapter that associates the wholesale services of the wholesale providers need not be conscious of the execution sequence of the wholesale services. In addition, the service provider can cause an execution of the APIs of the wholesale services to be in a predetermined sequence without being conscious of the execution sequence of the wholesale services of the coordinated service.

(6) A coordination rule includes a description of a third rule stipulating that the coordinated service associated with the item in the catalog be executed according to an asynchronous dependency such that certain ones of the wholesale services can be executed individually or in parallel. The execution section is further configured to, upon receipt from the terminal device 32 of an order for the coordinated service, execute the coordinated service in conformity with the asynchronous dependency stipulated in the third rule.

With this configuration, it is possible to execute the wholesale services of the coordinated service according to the asynchronous dependency rather than the synchronous dependency.

(7) The management section 14 is further configured to hold a catalog in which the coordinated service combining the wholesale services of the plurality of wholesale providers is described as an item of the catalog. A coordination rule 20d5 includes a description of a fourth rule stipulating that the coordinated service associated with the item in the catalog be executed in such a way that a response value in the event of executing one of the wholesale services of the coordinated service is set as a parameter to another one of the wholesale services of the coordinated service in the event of executing the other one and thereby complementation of the parameter is performed. The execution section is further configured to, in the event of executing the wholesale services of the coordinated service associated with the item in the catalog, execute the wholesale services according to the complementation stipulated in the fourth rule.

With this configuration, a person creating an adapter can cause the wholesale services to be executed, without being conscious of the coordination of the response values.

A description will be given of a program causing a computer to carry out the operation of the present embodiment. The computer serves as an API coordination device configured to execute a coordinated service combining wholesale services of a plurality of wholesale providers by launching an API published to a terminal device 32 of a service provider providing a communication service to a user and by launching, in response to an order from the terminal device 32, APIs through which the plurality of wholesale providers publish the wholesale services, the wholesale services providing communications services.

This program causes the computer to function as: means for describing a first rule defining API simplification which is to be performed in such a way that, among parameters for executing the coordinated service, a subset of the parameters is hidden and the others of the parameters are published to the service provider; and means for reading the first rule and launching the API published to the terminal device in such a way as to hide the subset of the parameters for executing the coordinated service and publish the others of the parameters to the terminal device 32.

With this program, like the above-described operational advantages of the API coordination device 10, it is possible to present a simplified set of the parameters for executing a plurality of wholesale services to the terminal device 32 of the service provider.

In addition, a specific configuration can be appropriately changed without departing from the gist of the present invention.

REFERENCE SIGNS LIST

10 API coordination device
11 API transmission/reception section
12 catalog read section
13 service API execution section
14 catalog/rule management section
20d, 20d1, 20d2, 20d3, 20d4, 20d5 coordination rule
32 terminal device

What is claimed is:

1. An application programming interface (API) coordination device configured to execute a coordinated service combining wholesale services of a plurality of wholesale providers by launching an API published to a terminal device of a service provider providing a communication service to a user and by launching, in response to an order from the terminal device, APIs through which the plurality of wholesale providers publish the wholesale services, the wholesale services providing communications services, the API coordination device comprising:
   a management section configured to hold a coordination rule including a first rule defining API simplification which is to be performed in such a way that, among parameters for executing the coordinated service, a subset of the parameters is hidden and the others of the parameters are published to the service provider; and
   an execution section configured to read the first rule held by the management section and to launch the API published to the terminal device in such a way as to hide the subset of the parameters for executing the coordinated service and publish the others of the parameters to the terminal device.

2. The API coordination device according to claim 1,
   wherein the coordination rule includes a description of default values corresponding to the subset of the parameters,
   wherein the default values are to be used for complementation of the subset, and
   wherein the execution section is further configured to read the coordination rule and to launch the API published to the terminal device in such a way that, among the parameters for executing the coordinated service, those corresponding to the default values are hidden and the others of the parameters are published to the terminal device.

3. The API coordination device according to claim 1,
wherein the management section is further configured to hold a catalog in which the coordinated service combining the wholesale services of the plurality of wholesale providers is described as an item of the catalog,
wherein the coordination rule further includes a description of a command associated with parameters corresponding to the coordinated service described as the item of the catalog, and
wherein the execution section is further configured to, upon receipt from the terminal device of an order for execution of a coordinated service by the command, execute the coordinated service which is associated with the command described in the coordination rule via the parameters corresponding to the coordinated service.

4. The API coordination device according to claim 1,
wherein the management section is further configured to hold a catalog in which the coordinated service combining the wholesale services of the plurality of wholesale providers is described as an item of the catalog,
wherein the coordination rule further includes a description of an execution sequence according to which the wholesale services of the coordinated service described as the item of the catalog are to be executed, the execution sequence being associated with a service editing process such as establishing a new coordination of wholesale services, modifying the wholesale services, and deleting the wholesale services, and
wherein the execution section is further configured to, upon receipt from the terminal device of an order for the service editing process, execute the wholesale services of the coordinated service in order in accordance with the execution sequence associated with the service editing process, which is described in the coordination rule and corresponds to the order.

5. The API coordination device according to claim 1,
wherein the management section is further configured to hold a catalog in which the coordinated service combining the wholesale services of the plurality of wholesale providers is described as an item of the catalog,
wherein the coordination rule further includes a description of a second rule defining a synchronous dependency such that only when a certain one of the wholesale services has been executed, another one of the wholesale services is allowed to be executed and such that a response value out of an API execution of the certain one of the wholesale services is circulated as a parameter to an API execution of the another one of the wholesale services, and
wherein the execution section is further configured to, upon receipt from the terminal device of an order for the coordinated service, execute the coordinated service in conformity with the second rule defining the synchronous dependency.

6. The API coordination device according to claim 5,
wherein the coordination rule further includes a description of a third rule stipulating that the coordinated service associated with the item in the catalog be executed according to an asynchronous dependency such that certain ones of the wholesale services can be executed individually or in parallel, and
wherein the execution section is further configured to, upon receipt from the terminal device of an order for the coordinated service, execute the coordinated service in conformity with the asynchronous dependency stipulated in the third rule.

7. The API coordination device according to claim 1,
wherein the management section is further configured to hold a catalog in which the coordinated service combining the wholesale services of the plurality of wholesale providers is described as an item of the catalog,
wherein the coordination rule further includes a description of a fourth rule stipulating that the coordinated service associated with the item in the catalog be executed in such a way that a response value in the event of executing one of the wholesale services of the coordinated service is set as a parameter to another one of the wholesale services of the coordinated service in the event of executing the another one and thereby complementation of the parameter is performed, and
wherein the execution section is further configured to, in the event of executing the wholesale services of the coordinated service associated with the item in the catalog, execute the wholesale services according to the complementation stipulated in the fourth rule.

8. An application programming interface (API) coordination method performed by an API coordination device configured to execute a coordinated service combining wholesale services of a plurality of wholesale providers by launching an API published to a terminal device of a service provider providing a communication service to a user and by launching, in response to an order from the terminal device, APIs through which the plurality of wholesale providers publish the wholesale services, the wholesale services providing communications services, the API coordination method comprising steps of:
creating a coordination rule including a first rule defining API simplification which is to be performed in such a way that, among parameters for executing the coordinated service, a subset of the parameters is hidden and the others of the parameters are published to the service provider; and
reading the first rule and launching the API published to the terminal device in such a way as to hide the subset of the parameters for executing the coordinated service and publish the others of the parameters to the terminal device.

9. A non-transitory computer-readable medium storing a program causing a computer to function as an application programming interface (API) coordination device configured to execute a coordinated service combining wholesale services of a plurality of wholesale providers by launching an API published to a terminal device of a service provider providing a communication service to a user and by launching, in response to an order from the terminal device, APIs through which the plurality of wholesale providers publish the wholesale services, the wholesale services providing communications services, the program causing the computer to function as:
means for holding a description of a first rule defining API simplification which is to be performed in such a way that, among parameters for executing the coordinated service, a subset of the parameters is hidden and the others of the parameters are published to the service provider; and
means for reading the first rule and launching the API published to the terminal device in such a way as to hide the subset of the parameters for executing the coordinated service and publish the others of the parameters to the terminal device.

* * * * *